United States Patent [19]

Samples

[11] 3,894,979
[45] July 15, 1975

[54] COMPOSITION AND METHOD FOR MAKING UNIFORMLY DISPERSED FRIABLE COMPOUNDING INGREDIENTS

[75] Inventor: Charles R. Samples, Akron, Ohio

[73] Assignee: Akron Rubber Development Laboratory, Inc., Akron, Ohio

[22] Filed: Aug. 17, 1973

[21] Appl. No.: 389,430

Related U.S. Application Data

[63] Continuation-in-part of Ser. No. 251,226, May 8, 1972, abandoned.

[52] U.S. Cl. 260/23.7 R; 260/33.6 A; 260/33.6 UA; 260/77.5 R; 260/79.5 NV; 260/94.7 S
[51] Int. Cl. ............................................. C08c 11/72
[58] Field of Search..... 260/23.7 R, 77.5 R, 33.6 A, 260/33.6 UB, 94.7 S, 79.5 NV

[56] References Cited
UNITED STATES PATENTS
| | | | |
|---|---|---|---|
| 3,427,366 | 2/1969 | Verdol | 260/23.7 R |
| 3,505,383 | 4/1970 | Seki | 260/23.7 R |

*Primary Examiner*—Melvyn I. Marquis
*Assistant Examiner*—William E. Parker
*Attorney, Agent, or Firm*—Oldham & Oldham Co.

[57] ABSTRACT

One embodiment of the present invention, a friable composition is formed by hydroxyl terminated polymers which are coupled by diisocyantes in which the equivalent ratio of the isocyanate groups to the hydroxyl groups is from about 0.9 to about 1.2. Catalysts which promote isocyanate coupling are utilized. A compounding ingredient such as curing agents, reinforcers, moisture scavengers, accelerators and the like, is added to the above mixture so that upon coupling, a gelled friable composition is formed.

The method relates to a compounding ingredient which is added to a gelling dispersant system comprising a coupling system such as a diisocyanate and a reactive hydroxyl terminated polymer with usually a small amount of catalysts, blending the materials to form a uniform mixture, and producing a gelled mass upon coupling so that a good dispersion of the compounding ingredient is obtained. A friable product is produced in situ.

34 Claims, No Drawings

COMPOSITION AND METHOD FOR MAKING UNIFORMLY DISPERSED FRIABLE COMPOUNDING INGREDIENTS

CROSS REFERENCE TO RELATED PATENT

This application is a continuation-in-part application of my earlier application filed on May 8, 1972, bearing Ser. No. 251,226 now abandoned.

BACKGROUND OF INVENTION

In many different operations, particularly in the rubber compounding field, it is very common to disperse a solid or a liquid material such as compounding ingredients into a carrier medium for use at a later time or for use in controlled amounts with other materials. The mixed carrier material is provided for ease in handling, safety or other reasons. Often, many materials are difficult to disperse, and some of such materials are conventional compounding materials as used in the rubber industry. However, in accordance with the present invention, many of these materials can be dispersed very well in the dispersing medium and by the dispersing system as described hereinafter.

SUMMARY OF THE INVENTION

The general object of the present invention is to provide a dispersant medium or system wherein provision of a uniform and generally random distribution is facilitated and large amounts of solid or liquid compounding ingredients can be dispersed in a small amount of the dispersant medium which thereafter can be gelled.

Another object of the invention is to form gels from hydroxyterminated polymers and a diisocyanate coupling system or reactants wherein a gellable dispersion is provided as the carrier medium for a solid or liquid compounding ingredient.

A still further object of the present invention is to form gels from non-hydroxyterminated as well as hydroxyterminated polymers and crosslinking agents wherein a gellable dispersion is provided as the carrier medium for a solid or liquid compounding ingredient.

It is yet another object of the present invention to form a gelled product whereby the liquid or solid compounding ingredient is eliminated as a potential toxicant in later applications.

Other objects of the invention are to reduce the cost and difficulties of dispersing large quantities of solid or liquid compounding ingredients into a rubber-oil carrier system and wherein catalysts and diisocyanate coupling agents or other reactants are provided as catalysts for gelling action in the dispersant system; and to form friable gelled products from liquid polymers and other materials.

Other objects and advantages of the invention will appear from the following specification.

SUBJECT MATTER OF THE INVENTION

The present invention relates to the use of a hydroxyterminated polymer, coupling agent, and a catalyst, to form a dispersant medium but other coupling systems and polymers can be used. It has been discovered that certain combinations of these materials produce an efficient dispersant medium which is very compatible with rubber compounds.

The general theory of the invention is that a broad range of a compounding ingredient is added to and mixed with the dispersant system. These materials are mixed in a liquid or semi-liquid medium until a uniform mixture is obtained. Gelation then occurs due to the crosslinking of the dispersant system. The length of time before gelation can be regulated by the amount of catalyst employed or the application of heat. Generally, it is thought that the gel forms around the added compounding ingredient, trapping the molecules or particles of such material in the position of uniform mixing.

One of the principal advantages of the dispersant medium or system is that it is liquid or a flowable paste while mixing occurs. Mixing is easy and complete when liquids are involved and these are desirable features. Another advantage of this system is that generally, a large amount of compounding ingredient material can be dispersed in a small amount of the dispersant medium. The finished gelled, friable product is held together by a low molecular weight polymer system which makes the material easy to handle, and gives quick mixing when later added to a mill or the like. If the material being dispersed reacts with the gelling system being used, then other equivalent systems can be substituted.

In general, the compounding ingredient can be any ingredient or material used in the preparation of plastics or rubbers and particularly in the preparation of conventional rubber compounds. For example, the compounding ingredient may be a curing agent such as various sulfur compounds and organic peroxides. The compounding ingredient may be reinforcing materials such as carbon black, silica, silicate, silicone elastomers, calcium carbonate, talc, zinc oxide, magnesium carbonate and the like. The class of compounding ingredients include accelerators such as the thioureas, thiophenols, mercaptans, dithiocarbamates, xanthates, trithiocarbamates, dithio acids, thiazoles, thiuram sulfides, ureas, quanidines, sulfenamides, and aldehydeamines. Conventional moisture scavengers constitute yet another class of compounds which may be added to a dispersant gel medium for later use in a compounding process. Stabilizers is another compounding ingredient which can be dispersed in a gel for later additions to a compounding process. These, of course, vary depending upon the type of polymers but a few examples include the organotins, the tin carboxylates, alkylated phenols, aromatic amines, organic phosphites and phenyl salicylates. Many other stabilizers well known to those skilled in the art may also be used. Other types of compounding ingredient used in the plastic and rubber field include antioxidants, antiozonants, and antistatic agents. Plasticer is yet another class and typical examples include dibutyl phthallate and tri-cresyl phosphate.

The ranges of these various typical types of compounding ingredients as well known to one skilled in the art will usually be broad as well as different from compound to compound. However, the range for any particular compound can be quickly determined by simple experimentation and gelled according to the concepts of present invention. Ranges of some of the more widely used compounding ingredients are set forth below.

One example of this invention is the dispersion of a curing agent such as sulfur for a master batch. Presently sulfur is being mixed with either solid rubber, or oil to form controlled sulfur carriers. Neither of these mixtures is desirable because the former must be carried out in a relatively expensive Banbury or Mill and because in the latter the dispersion is a hard to handle paste. Generally, the present invention can uniformly disperse a very small amount such as about one or two parts by weight to a very large amount such as about several hundred parts by weight of a curing agent for every one hundred parts of the dispersant medium of the invention system and this mixing can be done in a more economical mixing apparatus such as a Hobart or Cowles mixer in generally, a much shorter time period. The gel time is generally regulated by monitoring the amount of the catalyst used. By this method, the gel structure is thought to form around the sulfur and uniform dispersion is assured.

Generally, any hydroxyl terminated liquid polymer can be used as polyesters, polyethers, polyanhydride or the like. However, hydroxyl terminated rubberlike polymers are preferred. Such rubberlike polymers which are made according to conventional methods and techniques well known to one skilled in the art and then terminated with a hydroxyl also according to method and techniques well known to one skilled in the art can generally be classified as urethane polymers, polymers made from conjugated dienes containing from 4 to about 12 carbon atoms and preferably from 4 to about 8 carbon atoms and vinyl substituted aromatic monomers containing from 8 to about 13 carbon atoms. Moreover, non-hydroxyl terminated rubberlike polymers may be used to form a gelled system. Specific examples include polybutadieneacrylonitrile, styrenebutadiene rubber, acrylonitrile monomers and butadiene monomers in various ratios to form copolymers known as nitrile rubber compounds and the neoprene polymers which denote various rubberlike polymers and copolymers of cloroprene, i.e. 2, - chloro -1,3 - butadiene. These non-hydroxyl terminated rubberlike polymers as well as the hydroxyl terminated polymers will generally react with sulfur compounds and organic peroxides to couple and form a gelled mixture.

Examples of conjugated dienes include 1,3-butadiene; isoprene; 2,3-dimethyl-1,3-butadiene; 2-methyl-1,3-pentadiene; 3,4-dimethyl-1,3-hexadiene; 4,5-diethyl-1,3-octadiene; 3-butyl-1,3-octadiene; phenyl-1,3-butadiene and the like. The vinyl substituted aromatic compounds include styrene, 1-vinylnaphthalene, 2-vinylnaphthalene, and the alkyl, clycloalkyl, aryl, alkaryl and arakyl derivatives thereof in which the total number of carbon atoms in the combined substituents is generally not greater than 13. Examples of such compounds include 3-methylstyrene; α-methylstyrene; 4-n-propylstyrene, 4-t-butylstyrene, 4-dodcylclostyrene, 4-cyclohexylstyrene; 2-ethyl-4-benzylstyrene; 4-methoxystyrene; 4-dimethylaminostyrene; 3,5-diphenoxystyrene; 4-p-tolylstyrene; 4-phenylstyrene; 4,5-dimethyl-1-vinylnaphthalene; 3-n-propyl-2-vinylnaphthalene and the like.

The urethane polymers generally contains a significant number of urethane groups regardless of what the rest of the molecule may contain. Generally, the urethane polymers may be prepared by reacting any of the below polyfunctional isocyanates having the formula $R(N=C=X)_2$ where R is an aliphatic having from 2 to 20 carbon atoms, a cycloaliphatic having from 4 to 20 carbon atoms and an aromatic containing from 6 to 20 carbon atoms and X is a chalcogen (oxygen or sulfur) with polyhydroxy compounds which has at least two hydroxyl groups.

Examples of polyhydroxy compounds include the di- and polyhydric alcohols, the di- and polyhydric phenols, the polyethers, the polyesters, and the polylactone diols. Compounds containing groups such as amino and carboxyl may also be used. Suitable di- and polyhdric alcohols which may be reacted with polyisocyanates include the conventional alcohols which are commonly used in the formation of urethanes and in general the di- and polyhydric alcohols which contain from 2 to 25 carbon atoms where the alcohol is an aliphatic and from 4 to 25 carbon atoms where the alcohol is a cycloaliphatic. Specific examples of dihydric alcohols include primary and secondary diols such as ethylene glycol; 1,2-propanediol; 1,4-butanediol; 1,6-hexanediol; 1,3-butanediol; 1,2-butanediol, 2,3-hexanediol; 3,4-hexanediol and 2,5-hexanediol. An example of a specific cyclo alcohol is 1,2-cyclopentanediol. Di- and polyhydric phenols containing from 6 to 25 carbon atoms may also be used although they tend to react more slowly than do the alcohols. Examples of di- and polyhydric phenols include catechol, resorcinol, quinol, pyrogallol, phloroglucinol, 1,2,4-trihydroxy benzene and 1,2,3-trihydroxybenzene.

The polyethers are another large class of polyhydroxy compounds which may be reacted with polyisocyanates to form urethane polymers. Examples of polyethers include those derived from propylene oxide and/or ethylene oxide as well as the poly(oxalkylene) derivatives of polyhydric alcohols such as glycerol, 2-ethyl-2 hydroxymethyl-1,3-propanediol, 1,2,6-hexanetriol and sorbitol. Additional polyethers which may be used include the poly(oxypropylene) triols and the polyethers which have greater than three hydroxy groups such as those made from the polyols of sorbitol, mannitol, pentaerythritol, and sucrose. A preferred group of polyethers are the polytetramethyleneoxide glycols which, of course, are prepared by the polymerization of tetrahydrofuran.

The polyesters constitute yet another class of polyhydroxyl compounds which may be used to form the urethane polymers. Typical monomers used to prepare polyesters include adipic acid, phthalic anhydride, ethylene glycol, propylene glycol, 1,3-butylene glycol, 1,4-butylene glycol and diethylene glycol. For preparation of branched polyesters, triols such as 1,2,6-hexanetriol, trimethylolpropane and 2-hydroxylmethyl-2-methyl-1,3-propanediol may be used. Also, lactones such as caprolactone have been used to prepare polyesters. As apparent to one skilled in the art, it is desirable to use polyesters which contain only hydroxyl groups as reactive sites and hence polyesters which have very low acid numbers and very low water content are preferred.

The polylactone diols constitute yet another class of polyhydroxyl compounds which may be used to form the urethane polymers. The lactones used in the preparation of the polylactone diols contain at least 2 carbon atoms and generally up to 15. Examples of specific lactones include caprolactone and capylactone. The polylactone diols made from caprolactone are preferred in the present invention.

Examples of the nitrile rubbers, of course, include the copolymers of acrylonitrile and butadiene made from different monomer ratios. Neoprene, of course, is a polymer and sometimes a copolymer made from the monomer 2-chloro-1,3-butadiene.

Preferred monomers and compounds for the hydroxyl-terminated polymers include 1,3-butadiene, isoprene, styrene and butadiene-styrene copolymers. Generally, conventional urethane polymers are also preferred. Non-hydroxyl-terminated compounds include acrylonitrile-butadiene copolymers, and the neoprene polymers. A specific example of hydroxyterminated liquid polybutadiene for use in the present invention is Atlantic Richfield Company's PBD R45HT,R45M. CS15 is a specific example of an hydroxyl terminated styrene/butadiene copolymer. Examples of polyisobutylene include bromobutyl X2 (carboxyl terminated bromonated) produced by Polysar and Vistonex (low mol. wt.) produced by Enjay. Specific examples of nitrile rubbers are B. F. Goodrich's HYCAR MTB, HYCAR CTB and HYCAR 1312. The latter is carboxyterminated and all contain an active hydrogen at the chain end and thus may be coupled by a diisocyanate. SBR-FLOSBRENE manufactured by the American Synthetic Rubber Company is a specific example of a styrene-butadiene copolymer. Neoprene F8 is, of course, a neoprene and is produced by DuPont. A specific hydroxyl terminated polyester is FORMREZ 112R produced by Witco Chemical and a specific polyether based isocyanate polymer is CASTOMER T = 4082 produced by Witer Chemical.

Any coupling compound which reacts with hydroxyls or the rubberlike polymer can be used to couple extend or join the above polymers. A preferred group of coupling agents are the diisocyanates or diisothiocyanates represented by the formula $R(N = C = X)2$ where R can be an aliphatic containing from 2 to 20 carbon atoms, a cycloaliphatic containing from 4 up to about 20 carbon atoms and an aromatic containing from 6 to about 20 carbon atoms and X is a chalcogen (oxygen or sulfur). Examples of diisocyanates include:

Diphenylmethane diisocyanates
1,5-Naphthylene diisocyanate
4,4',4''-Triphenylmethane triisocyanate
Xenylene diisocyanate
Chlorophenylene 2,4-diisocyanate
Methylene bis(4-phenyl) diisocyanate
Tolidine diisocyanate
Polymethylene polyphenyl isocyanate
3,3'-Dimethyl-4,4'-biphenyl diisocyanate
Methyl cyclohexylene diisocyanate
Dicyclohexylmethane diisocyanate
Paraphenyl diisocyanate
p-Phylene diisocyanate
3,3'-Dimethyl-4,4'-diphenylmethane diisocyanate
4,4'-Diphenylisopropylidine diiocyanate
3,3'-Dimethyl-4,4'-diphenyl diisocyanate Preferred diisocyanates include:
Toluene diiocyanates
1,4-Phenylene diiocyanate
Bitoluene diisocyanates
Hexamethylene diiocyanate
Dianisidine diiocyanates Of course, the diisothiocyanates which correspond to the above diisocyanates can also be used. It is to be understood that whenever reference is made in this specification to diiocyanate, it should be obvious to one skilled in the art that such reference also includes isothiocyanates.

Considering specifically the curing agents class of compounding ingredients, generally any conventional curing agent as well known to those skilled in the art can be used. In the present invention, sulfur, litharge (lead mono-oxide) and organic peroxide curing agents are generally preferred. Sulfur and convention sulfur curing compounds as well as conventional litharge compounds well known to those skilled in the art can be used. Examples of organic peroxides include benzoyl peroxide, decanoyl peroxide, cyclohexanone peroxide, lauroyl peroxide, methyl ethyl ketone peroxide, ketone peroxide, para-chlorobenzoyl peroxide, ditertiary butyl peroxide, 2,4-dichlorobenzoyl peroxide, dicumyl peroxide diisopropylbenzene hydroperoxide, propionyl peroxide and the like.

When sulfur or sulfur compounds is the curing agent to be dispersed in the dispersant medium, the ratio of sulfur to the medium can vary over a very wide range depending upon the particular application. Generally, a ratio of roughly 100 parts to 400 parts of sulfur to 100 parts of medium by wt. has been found to be favorable in many situations although such ratios generally vary from about 1 part of sulfur to about 500 parts of sulfur. When an organic peroxide is utilized, a broad range also exists with a favorable ratio being approximately about 100 parts to about 400 parts of 60 to 80% active peroxide compound per 100 parts of dispersant. Of course, depending upon the situation, smaller amounts as low as 1 to 2 parts or large amounts such as several hundred can be utilized. The favorable range of the litharge is from about 500 to about 1000 parts by wt. per 100 parts of medium. Again, much smaller or larger amounts can be utilized. As a general rule, the ratio of the curing agent to the dispersant medium is not very important.

Of importance is the range of the hydroxylterminated polymers and rubber polymers to the curing agent. Generally, a range of about 1 to about 22 parts by weight per 100 parts of curing medium is desired with 1 to about 9 parts being preferred. Since the coupling agents serve to extend the hydroxyl terminated polymers which, as noted above, are preferably rubberlike, the equivalent ratio of coupling agent such as diisocyanate to the hydroxyl terminated polymers is generally from about 0.9 to about 1.2 with a preferred ratio being approximately 1.1. However, as a practical matter, the excess amount of diisocyanate may have to be utilized if the compound or composition contains moisture or active hydrogen compounds as should be obvious to one skilled in the art. Thus, the ratio may range from 0.9 to about 3.0 as disclosed by Examples 1–32.

When non-hydroxyl terminated compounds are used such as nitrile rubbers, neoprene, styrene butadiene rubber, or polyisobutylene, a curing agent such as sulfur, sulfur compounds, organic peroxide, or litharge must be used in order to achieve crosslinking of the polymers. Also, such curing agent may be used to crosslink the hydroxyl terminated polymers. Should the curing agent be the compounding ingredient as it often is, then an excess is used so that active curing agents remain in the gel which agents are used upon application of the gel such as to a master batch tire tread compound. The amount of sulfur, sulfur compound, or organic peroxide used is generally from 1 to about 20 parts with 1 to 10 parts by weight of 100 parts of the polymer preferred.

Although the reaction between the hydroxyl terminated polymers and the coupling agents produce a highly viscous solution to generally form a gel, catalysts are often desirable to speed-up the reaction time and may be used when non-hydroxyl terminated rubber compounds are utilized. The catalysts employed in the present invention can be conventional metal or amine catalysts which have a favorable relative reaction with coupling agents such as diisocyanates. Generally such catalysts can be classified as metallic esters (soaps) or amine catalysts although other compounds can be utilized. Examples include:

Antimony trichloride
Sodium propionate
Lithium acetate
N-Tetramethylethylenediamine
N-Tetramethyl-1-3-butanediamine
4-Dimethylaminopyridine
Triethylamine
N-Ethylmorpholine
1,2,4-Trimethyl piperazine
N-Aminoethyl piperazine
Cobalt naphthenate
Cobalt benzoate
Stannous oleate
Manganese naphthenate
Manganese 2-ethylhexoate
Manganese linoresinate Preferred examples include:

Antimony pentachloride
Potassium oleate
Triethylene diamine
N-N-Dimethylbenzylamine
Cobalt 2-ethylhexoate
Cobalt octoate
Dibutyltin dilaurate
Stannous octoate
Stannous chloride
Lead Benzoate
Lead oleate
Zinc naphthenate
Zinc 2-ethylhexoate Depending upon the chain extending or coupling time required to produce a gel, the amount of catalysts can be accordingly varied. To reduce costs, a fairly quick gel time such as between 3 and 10 minutes is usually desired. Generally, the metallic or amine catalysts range of from about 0.1% to about 10% by wt. based on the hydroxyl terminated or rubber polymer has been found to produce such fairly quick gel times.

In addition to the above ingredients, it is often highly desirable to add oil or conventional plasticizers to load or wet the curing agents particularly when solid curing agents are used and to further aid in processing the mixture. The oils are generally any conventional organic oil used in compounding or production of rubber. More specifically, the oil can be paraffinic, aromatic or naphathinic of commercial grade as used in rubber compounding. The plastizers are preferably any ester plasticizer well known to those skilled in the art. The amount of oil or plasticizer will tend to vary with the amount of curing agent as well as with the particle size of the curing agent with a fine particle requiring more oil than course particles. Generally, the amount of oil, plasticizer or other liquid medium must be high enough so that upon coupling the system will gel. This is readily achieved when enough oil, plastizicer or liquid exists to coat each compound ingredient particle which amount can be readily determined for various dispersant medium by one skilled in the art. Typically, the oil may range from less than 25 to about 95 parts by weight of 100 parts of the dispersant medium. Of course, when other liquid compounds are used in the dispersant medium such as fillers, the amount of oil required will generally be less and thus may be well below 25 parts by weight as set forth in one of the examples. Moreover, it is noted that liquid monomers or solvents such as styrene may be used in lieu of an oil. An example of specific fillers include aluminum silicate, Hi Sil 233 which is a commercially available hydrated powdered silicia filler.

Considering now the process for preparing a friable curing composition, the preparation of the gel-like material may be carried out at ambient temperatures and atmospheric pressures by mixing the various compounds in a convention mixing apparatus such as a Cowles or Hobart mixer, or equivalent for a sufficient amount of time at room temperature or at one slightly above ambient temperature due to mixing reaction so that a uniform or random distribution of material is obtained. Should a Banbury type mixer be used, the temperature of mixing preferably will vary between about 160° and 240°F. In forming the gelled mix, the following steps are generally involved:

1. Curing agent and oil are blended together in the mixer.
2. The hydroxyl terminated liquid polymer or rubber polymer is added to the mix.
3. Diisocyanate and catalysts are added.
4. Fillers and other compounds added.
5. Mixing contined for a short time such as about one-half to one minute or until a uniform distribution of the curing agent is obtained..
6. Mix transferred to a storage tank, mold, or shipping carton for gel action.

However, this order of mixing is not imparative as long as the mix can be blended or mixed to substantially uniform consistency before gelling occurs. It also is possible to add the hydroxyl terminated polymer to the diisocyanate first to form a coupled polymer before adding the materials to the sulfur-oil mix or other batch being processed. Preferably the catalyst is added last.

Upon mixing, the catalyst promotes rapid reaction of the diisocyanate with the hydroxyl terminated polymer to couple the polymer thereby forming a polymer of much greater molecule weight. If a non-hydroxyl terminated polymer is utilized, the curing agents will cause the polymer to couple. Such coupling increases the viscosity of the mixture into a very viscous or gel-like solution and thereby maintains the curing agent in uniform distribution.

The ideal gel has a weak cheese-like consistency and can be broken up into particles readily. The overall mixing and gelling operation generally requires only 3 to about several minutes depending of course, upon the amount of catalysts used. The gelled material can be stored over long periods of time and is ready for use in the preparation of a master batch of rubber. Due to the uniform distribution of the gel, the compounding ingredient is quickly and uniformly distributed throughout the master batch. In comparison, compounding ingredients adding with solid compounds or directly to the master batch takes a much longer blending time and moveover, it is often difficult to achieve a uniform distribution.

In the actual mixing of the compounding ingredient, generally the amount which can be dispersed is primarily a volume consideration. For example, a material with a greater specific gravity than a curing agent such as sulfur could be dispersed with less of the dispersant.

Thus, litharge (PbO) having a specific gravity of about 9 could have about 1,000 to about 1,200 lbs. dispersed in the 100 lbs. of gel mixture formulation and about 150 lbs. of a material with a gravity of one (1.0) such as an organic peroxide could be efficiently dispersed in the same 100 lbs. quantity of gel forming materials. Hence, if the material or compounding ingredient being dispersed is double the specific gravity of that of another material, then one can disperse twice as much by weight in the same amount of the dispersion medium. Such dispersed compounding ingredients can be either a powder or a liquid.

Over and above the cost savings provided in the mixing action, there is a power saving and equipment cost saving and in addition, there are fewer scorched batches, and less scrap is obtained due to a better dispersion action. Moreover, the dusting or toxicity problems of some of the compounding ingredients are eliminted. Furthermore, in mixing a typical rubber, such as a polybutadiene with oil, known activators or curing agents or plasticizers, if desired, can be added and be such so as to aid in curing the product at any conventional temperature under controllable cure times.

The invention will be more fully understood by reference to the following examples.

EXAMPLE 1

The following ingredients were added to a conventional Cowles mixer and blended for 5 minutes at ambient temperature and atmospheric pressure.

|  | Parts by Weight | Approx. Parts by Volume |
| --- | --- | --- |
| Sulfur (powdered) | 300 lb. | 150 lb. |
| Oil (commercial grade paraffinic) | 90 lb. | 90 lb. |
| Polybutadiene (hydroxyl terminated PBD45HT)) | 9 lb. | 9 lb. |
| Diisocyanate (Upjohn's methylene diisocyanate 143L) | .9 lb. | .9 lb. |
| Dibutyl tin dilaurate (DBTDL) | .1 lb. | .1 lb. |

After mixing during which a slight increase in temperature occured due to the exothermic reaction between the polybutadiene polymer and the diisocyanate, the composition was allowed to stand whereupon in a matter of a couple to a few minutes, a gel-like friable curing composition was produced with the sulfur uniformly dispersed therein.

EXAMPLE 2

Under conditions similar to those set forth in Example 1, another gel containing sulfur dispersed therein was produced. The recipe is as follows:

|  | Weight |
| --- | --- |
| Sulfur | 300 |
| Polybutadiene (PBD45HT) | 20 |
| Isonate 390P (Upjohn) | 3 |
| DBTDL | 0.1 |
| HiSil 233 (P.P.G), hydrated powdered silica filler material | 9.9 |
| Styrene (Solvent) | 67 |

EXAMPLE 3

Another gel having the following recipe was produced as in Example 1.

|  | Weight |
| --- | --- |
| Sulfur | 300 |
| PBD45HT | 3.65 |
| Diisocyanate (Isonate 143L) | .72 |
| DBTDL | .22 |
| Diatomaceous Earth (Microcel, Johns Manville) | 20.30 |
| Rubber Processing Oil (Circo Light R.P.O.-Naphthenic Oil, manufactured by Sunoco | 75 |

EXAMPLE 4

A gel having the following recipe was produced as in Example 1.

|  | Weight |
| --- | --- |
| PbO (Litharge H33, (Eagle Picher) | 90.00 |
| Aluminum Silicate | 3.00 |
| Oil (Circolite Light R.P.O.) | 4.77 |
| PBD45HT | 1.71 |
| Diisocyanate (Isonate 143L) | .45 |
| DBTDL | .07 |

EXAMPLE 5

Another example of a gelled, friable product made by the method of the invention was made as follows:

|  | Parts by Weight |
| --- | --- |
| Hycar CTB | 15 |
| Oil | 15 |
| Epon 828 | 3 |
| NA22 | 67 |

Hycar CTB is a commercially available nitrile rubber elastomer, Epon 828 is an epoxy resin product of Shell Chemical Co. and NA22 is a powdery accelerator made by DuPont. After the ingredients were mixed together for about two minutes, they were transferred into a container where gelation occurred.

In the following examples, friable compositions were made by mixing the compounds together, blending for a few minutes and then allowing the compounds to react which required only a matter of minutes to form a friable composition.

EXAMPLE 6

| 50% | Carbon Black, solid gell | |
| --- | --- | --- |
|  | FEF Black Fast Extruding Furnace | 50 |
|  | Circosol 42XH Naphthenic Oil | 35 |
|  | Poly bd R45HT | 11.5 |
|  | Isonate 143 L Liquid Methylene bis phenyl isocyanate | 3.0 |
|  | DBTDL | .4 |

EXAMPLE 7

| 80% | Carbon Black, gelled pellets | |
| --- | --- | --- |
|  | FEF Black | 80 |
|  | Circosol 42XH | 17.78 |
|  | Poly bd R45HT | 1.71 |

EXAMPLE 7-Continued

| | |
|---|---|
| Isonate 143L | .45 |
| DBTDL | .06 |

EXAMPLE 8

| | | |
|---|---|---|
| 55% | Magnesium Oxide, gelled pellets | |
| | Maglite D (Merck & Co.) | 55.0 |
| | Sunpar 110 (Parafinic Oil; Sun Oil Co.) | 34.3 |
| | Formez 112-R hydroxy terminated polyester | 10.0 |
| | Hylene TM (T.D.I.; DuPont) | .7 |

The friable products obtained are thereafter normally used by being blended in with elastomer mixtures for forming article producing compositions. The friable gel is readily and easily mixed into such compositions by conventional mixing actions.

It can be seen that the disclosed invention carries out the objects of the invention set forth above. As will be apparent to those skilled in the art, many modifications can be made without departing from the spirit of the invention herein disclosed and described.

What is claimed is:

1. A friable compounding composition, comprising:
a compounding agent,
a gel dispersant medium,
said gel dispersant medium containing liquid hydroxyl terminated polymers selected from the class consisting of conjugated dienes, and polyester, coupled by a diisocyanate compound having the formula $R(N=C=X)_2$ where R is an aliphatic hav-

EXAMPLES 9 THROUGH 16

| 50% CARBON BLACK, SOLID GEL | 9 | 10 | 11 | 12 | 13 | 14 | 15 | 16 |
|---|---|---|---|---|---|---|---|---|
| FEF Black, Fast Extruding Furnace | 50.00 | 50.00 | 50.00 | 50.00 | 50.00 | 50.00 | 50.00 | 50.00 |
| Circosol 42XH Naphthenic Oil | 35.00 | 35.14 | 35.32 | 35.43 | 35.00 | 35.00 | 35.00 | 35.00 |
| Poly bd R45HT Hydroxyl terminated | 11.50 | — | — | — | — | — | — | — |
| Poly bd R45M Polybutadiene | — | 11.50 | — | — | — | — | — | — |
| Poly bd CS15 | — | — | 11.50 | — | — | — | — | — |
| Formez 112R Hydroxyl terminated Polyester | — | — | — | 11.50 | — | — | — | — |
| Isonate 143L Liquid Methylene bis Phenyl isocyanate | 3.00 | 2.96 | 2.78 | — | — | — | — | — |
| Hylene TM Toluene Diisocyanate | — | — | — | 2.47 | — | — | — | — |
| DBTDL | .40 | .40 | .40 | .10 | — | — | — | — |
| Hycar 1312 Liquid Nitrile Rubber, High Acrylonitrile Content | — | — | — | — | 13.50 | — | — | — |
| Vistanex Liquid Polyisobutylene | — | — | — | — | — | 13.50 | — | — |
| Flosbrene Liquid Styrene Butadiene Copolymer | — | — | — | — | — | — | 13.50 | — |
| Neoprene F Polychloroprene | — | — | — | — | — | — | — | 13.50 |
| DiCumyl Peroxide | — | — | — | 1.50 | 1.50 | 1.50 | 1.50 | 1.50 |

EXAMPLES 17 THROUGH 24

| 80% CARBON BLACK, GELLED PELLETS | 17 | 18 | 19 | 20 | 21 | 22 | 23 | 24 |
|---|---|---|---|---|---|---|---|---|
| FEF Black | 80.00 | 80.00 | 80.00 | 80.00 | 80.00 | 80.00 | 80.00 | 80.00 |
| Circosol 42XH | 17.78 | 17.79 | 17.82 | 17.90 | 17.78 | 17.78 | 17.78 | 17.78 |
| Poly bd R45HT | 1.71 | — | — | — | — | — | — | — |
| Poly bd R45M | — | 1.71 | — | — | — | — | — | — |
| Poly bd CS15 | — | — | 1.71 | — | — | — | — | — |
| Foamrez 112R | — | — | — | 1.71 | — | — | — | — |
| Hylene TM | — | — | — | .37 | — | — | — | — |
| Isonate 143L | .45 | .44 | .41 | — | — | — | — | — |
| DBTDL | .06 | .06 | .06 | .02 | — | — | — | — |
| Hycar 1312 | — | — | — | — | 2.00 | — | — | — |
| Vistanex | — | — | — | — | — | 2.00 | — | — |
| Flosbrene | — | — | — | — | — | — | 2.00 | — |
| Neoprene F | — | — | — | — | — | — | — | 2.00 |
| DiCumyl Peroxide | — | — | — | — | .22 | .22 | .22 | .22 |

EXAMPLES 25 THROUGH 32

| 55% MAGNESIUM OXIDE, GELLED PELLETS | 25 | 26 | 27 | 28 | 29 | 30 | 31 | 32 |
|---|---|---|---|---|---|---|---|---|
| Maglite D | 55.00 | 55.00 | 55.00 | 55.00 | 55.00 | 55.00 | 55.00 | 55.00 |
| Sunpar 110 | 33.84 | 33.86 | 33.92 | 34.04 | 33.50 | 33.50 | 33.50 | 33.50 |
| Poly bd R45HT | 10.00 | — | — | — | — | — | — | — |
| Poly bd R45M | — | 10.00 | — | — | — | — | — | — |
| Poly bd CS15 | — | — | 10.00 | — | — | — | — | — |
| Foamrez 112R | — | — | — | 10.00 | — | — | — | — |
| Hylene TM | — | — | — | .96 | — | — | — | — |
| Isonate 143L | 1.16 | 1.14 | 1.08 | — | — | — | — | — |
| DBTDL | .30 | .30 | .30 | .10 | — | — | — | — |
| Hycar 1312 | — | — | — | — | 10.00 | — | — | — |
| Vistanex | — | — | — | — | — | 10.00 | — | — |
| Flosbrene | — | — | — | — | — | — | 10.00 | — |
| Neoprene F | — | — | — | — | — | — | — | 10.00 |
| DiCumyl Peroxide | — | — | — | — | 1.50 | 1.50 | 1.50 | 1.50 | ing from 2 to 20 carbon atoms, a cycloaliphatic having from 4 to 20 carbon atoms, and an aromatic having from 6 to 20 carbon atoms and X is an oxygen or sulfur, said compounding agent dispersed in said gelled dispersant medium in an amount so that a friable compounding composition is formed.

2. A friable compounding composition according to claim 1, wherein said compounding agent is selected from the class consisting of curing agents, accelerators, stabilizers, antioxidents, antizonates, antistatic agents and plasticizers.

3. A friable compounding composition according to claim 1, wherein said composition contains a curing agent, said liquid hydroxyl terminated polymers ranging from about 1 to about 22 parts by weight per 100 parts of curing agent.

4. A friable compounding composition according to claim 3, wherein said liquid hydroxyl terminated polymer range is from about 1 part to about 9 parts by weight.

5. A friable compounding composition according to claim 3, wherein said curing agent is selected from the class consisting of sulfur, sulfur compounds, litharge, and organic peroxides.

6. A friable compounding composition according to claim 1, wherein said gelled dispersant medium incapsulates said compounding agent.

7. A friable compounding composition according to claim 1, wherein said composition contains a catalyst, said catalyst ranging from 0.1% to about 10% by weight based upon said liquid hydroxyl terminated polymer.

8. A friable compounding composition according to claim 1, wherein said dispersant medium contains a rubber compounding oil selected from the class of parafinic, aromatic and naphathinic.

9. A friable compounding composition as in claim 8 wherein the amount of said rubber compounding oil in the dispersant medium ranges from about 25% to about 95% by wt.

10. A friable compounding composition according to claim 2, wherein said compounding agent is a plasticizer.

11. A friable compounding composition as in claim 1, wherein the compounding ingredient is a liquid or solid.

12. A friable compounding composition according to claim 2, wherein said liquid hydroxyl terminated polymer is selected from the class consisting of 1,3 butadiene.

13. A friable compounding composition according to claim 2, wherein said diisocyanate compound is selected from the group consisting of toluene diisocyanates, 1,4-phenylene diisocyanate, bitoluene diisocyanates, hexamethylene diisocyanate, dianisidine diisocyanates, toluene diisothiocyanates, 1,4-phenylene diisothiocyanate, bitoluene diisothiocyanates, hexamethylene diisothiocyanate, dianisidine diisothiocyanates.

14. A friable compounding composition according to claim 3, wherein said liquid hydroxyl terminated polymer is selected from the class containing of 1,3 butadiene.

15. A friable compounding composition according to claim 3, wherein said diisocyanate is selected from the group consisting of toluene diisocyanates, 1,4-phenylene diisocyanate, bitoluene diisocyanates, hexamethylene diisocyanate, dianisidine diisocyanates, toluene diisothiocyanates, 1,4-phenylene diisothiocyanate, bitoluene diisothiocyanates, hexamethylene diisothiocyanate, dianisidine diisothiocyanates.

16. A friable compounding composition, comprising a compounding agent, a gelled dispersant medium, said gelled dispersant medium containing a curing agent coupling polymers selected from the class consisting of a polybutadiene, nitrile rubbers, styrene-butadiene rubber, neoprene, or a liquid hydroxyl terminated polymer selected from the class consisting of conjugated dienes, and polyester, said curing agent selected from the class consisting of sulfur, sulfur compounds, organic peroxides, and litharge, an amount of said curing agent ranging from 1% to about 20% by weight of said polymer, said compounding agent dispersed in said gelled dispersant medium in an amount so that a friable compounding composition is formed.

17. A friable compounding composition according to claim 16, wherein said compounding agent is a rubber compounding oil selected from the class of parafinic, aromatic or naphathinic.

18. A friable compounding composition according to claim 17, wherein said compounding oil ranges from about 25 parts to about 95 parts by weight of 100 parts of said dispersant medium.

19. A friable compounding composition according to claim 16, wherein said compounding agent is a plasticizor.

20. A friable compounding composition as in claim 16 wherein the compounding ingredient is a liquid or solid.

21. A friable compounding composition according to claim 16, wherein said polymer is selected from the class consisting of 1,3 butadiene, isoprene, and styrene-butadiene and said liquid terminated hydroxyl polymer is selected from the class consisting of 1,3 butadiene.

22. A friable compounding composition according to claim 16, wherein said compounding agent is selected from the class consisting of accelerators, stabilizers, antioxidants, antiozonates, antistatic agents and plasticizers.

23. A friable compounding composition according to claim 16, wherein said compounding agent is an excess amount of said curing agent.

24. A process for making a friable compounding composition in a vessel comprising the steps of:
adding a compounding agent,
liquid hydroxyl terminated polymers selected from the class consisting of conjugated dienes, and polyester,
adding a diisocyanate compound having the formula $R(N=C=X)_2$ where R is an aliphatic having from 2 to 20 carbon atoms, a cycloaliphatic having from 4 to 20 carbon atoms, and an aromatic having from 6 to 20 carbon atoms and X is oxygen or sulfur in an amount to couple said liquid terminated polymers,
mixing said compounds for a short time so as to achieve a uniformed distribution of said compounding agent, and
allowing said mixed components to stand to obtain a gelled friable composition containing said compounding agent.

25. A process for making a friable curing composition as in claim 24, including the additional step of adding a catalyst ranging from 0.5 to 10.0% by weight.

26. A process for making a friable compounding composition according to claim 24, including the additional step of adding a plasticizer. plasticizers plasticizer 27. A process for making a friable compounding composition according to claim 24, including the additional step of adding a rubber compounding oil selected from the class of parafinic, aromatic and naphathinic.

28. A process for making a friable compounding composition according to claim 27, wherein the amount of said rubber compounding oil in said dispersant medium ranges from about 25% to about 95% by weight.

29. A process for making a friable compounding composition according to claim 24, including the additional step of encapsulating said compounding agent in said gel dispersant medium.

30. A process for making a friable compounding composition according to claim 24, wherein said liquid hydroxyl terminated polymer is selected from the class consisting of 1,3 butadiene.

31. A process for making a friable compounding composition according to claim 24, wherein said diisocyanate compound is selected from the group consisting of toluene diisocyanates, 1,4-phenylene diisocyanate, bitoluene diisocyanates, hexamethylene diisocyanate, dianisidine diisocyanates, toluene diisothiocyanates, 1,4-phenylene diisothiocyanate, bitoluene diisothiocyanates, hexamethylene diisothiocyanate, dianisidine diisothiocyanates.

32. A process for making a friable compounding composition according to claim 24, wherein said compounding agent is a curing agent, said liquid hydroxyl terminated polymers ranging from about 1 to about 22 parts by weight per 100 parts of said curing agent.

33. A process for making a friable compounding composition according to claim 32, wherein said liquid hydroxyl terminated polymer ranges from about 1 part to about 9 parts by weight.

34. A process for making a friable compounding composition according to claim 32, wherein said curing agent is selected from the class consisting of sulfur, sulfur compounds, litharge and organic peroxides.

* * * * *